(12) United States Patent
Mondal et al.

(10) Patent No.: US 9,344,846 B2
(45) Date of Patent: May 17, 2016

(54) SYSTEMS AND METHODS FOR EFFECTIVE IDENTIFICATION OF GEO-LOCATION IN MOBILE HETNET ENVIRONMENTS

(71) Applicants: Subhas Chandra Mondal, Bangalore (IN); Amal Ghosh Arupathunazhiyil Venugopal, Bangalore (IN)

(72) Inventors: Subhas Chandra Mondal, Bangalore (IN); Amal Ghosh Arupathunazhiyil Venugopal, Bangalore (IN)

(73) Assignee: WIPRO LIMITED, Bangalore (IN)

( * ) Notice: Subject to any disclaimer, the term of this patent is extended or adjusted under 35 U.S.C. 154(b) by 123 days.

(21) Appl. No.: 13/975,203

(22) Filed: Aug. 23, 2013

(65) Prior Publication Data

US 2015/0011175 A1    Jan. 8, 2015

(30) Foreign Application Priority Data

Jul. 5, 2013   (IN) .......................... 3019/CHE/2013

(51) Int. Cl.
*H04W 4/02* (2009.01)
*H04W 4/22* (2009.01)

(52) U.S. Cl.
CPC ................ *H04W 4/023* (2013.01); *H04W 4/02* (2013.01); *H04W 4/025* (2013.01); *H04W 4/22* (2013.01)

(58) Field of Classification Search
None
See application file for complete search history.

(56) References Cited

U.S. PATENT DOCUMENTS 5,613,205 A * 3/1997 Dufour .......................... 455/440
7,907,579 B2   3/2011 Fitzgerald
(Continued)

FOREIGN PATENT DOCUMENTS

WO    WO 2008021889 A2    2/2008

OTHER PUBLICATIONS

European Telecommunications Standards Institute, "Evolved Universal Terrestrial Radio Access Network (E-UTRAN); Stage 2 functional specification of User Equipment (UE) positioning in E-UTRAN," http://www.etsi.org/deliver/etsi_ts/136300_136399/136305/09.03.00_60/ts_136305v090300p.pdf (Jul. 2010).

(Continued)

*Primary Examiner* — Lester Kincaid
*Assistant Examiner* — Daniel G Bassett
(74) *Attorney, Agent, or Firm* — Finnegan, Henderson, Farabow, Garrett & Dunner, L.L.P.

(57) ABSTRACT

This disclosure relates generally to location services, and more particularly to systems and methods for effective identification of geo-location in mobile HetNet environments. In one embodiment, a device geo-location method is disclosed, comprising: receiving one or more wireless signal strengths associated with connectivity of a user device to one or more wireless access points; calculating, via a processor, one or more distances of the user device from the one or more wireless access points using the one or more wireless signal strengths; triangulating a user device location coordinate using: a pre-determined wireless access point location coordinate associated with at least one of the one or more wireless access points; and the calculated one or more distances of the user device from the one or more wireless access points; and storing the user device location coordinate.

27 Claims, 11 Drawing Sheets

Wireless access point geo-location example flowchart

(56) References Cited

U.S. PATENT DOCUMENTS

| | | | |
|---|---|---|---|
| 2002/0119756 A1* | 8/2002 | Arai | 455/425 |
| 2003/0125046 A1* | 7/2003 | Riley et al. | 455/456 |
| 2006/0058037 A1* | 3/2006 | Kenyon | H04W 4/02 455/456.1 |
| 2006/0095348 A1* | 5/2006 | Jones et al. | 705/29 |
| 2007/0060097 A1* | 3/2007 | Edge et al. | 455/404.1 |
| 2008/0176583 A1* | 7/2008 | Brachet | H04W 4/028 455/456.3 |
| 2010/0306792 A1* | 12/2010 | Li et al. | 725/23 |
| 2011/0170524 A1* | 7/2011 | Arslan | H04W 64/003 370/338 |
| 2011/0230190 A1* | 9/2011 | Le Rouzic et al. | 455/435.2 |
| 2013/0217408 A1* | 8/2013 | Difazio | H04W 24/00 455/456.1 |
| 2013/0273921 A1* | 10/2013 | Kenington | H04W 16/18 455/446 |

OTHER PUBLICATIONS

Institute of Electrical and Electronics Engineers, "Supplement to IEEE Standard for Information technology—Telecommunications and information exchange between systems—Local and metropolitan area networks—Specific requirements—Part 11: Wireless LAN Medium Access Control (MAC) and Physical Layer (PHY) specifications: High-speed Physical Layer in the 5 Ghz Band," http://standards.ieee.org/getieee802/download/802.11-2012.pdf (Sep. 16, 1999).

Institute of Electrical and Electronics Engineers, "Supplement to IEEE Standard for Information technology—Telecommunications and information exchange between systems—Local and metropolitan area networks—Specific requirements—Part 11: Wireless Lan Medium Access Control (MAC) and Physical Layer (PHY) specifications: Amendment 9: Interworking with External Networks," http://standards.ieee.org/getieee802/download/802.11u-2011.pdf (Feb. 25, 2011).

* cited by examiner

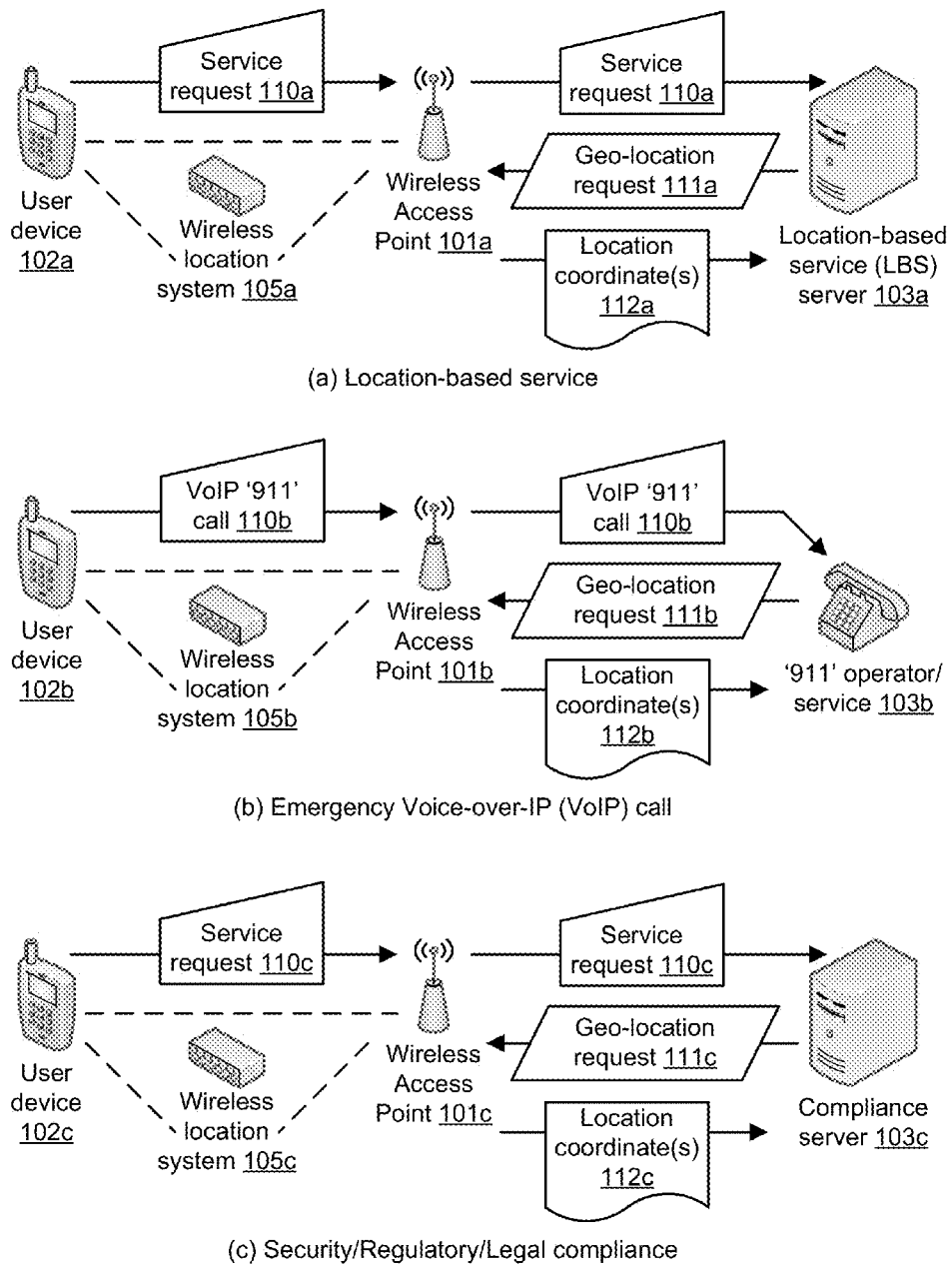
FIG. 1: Example geo-location identification uses

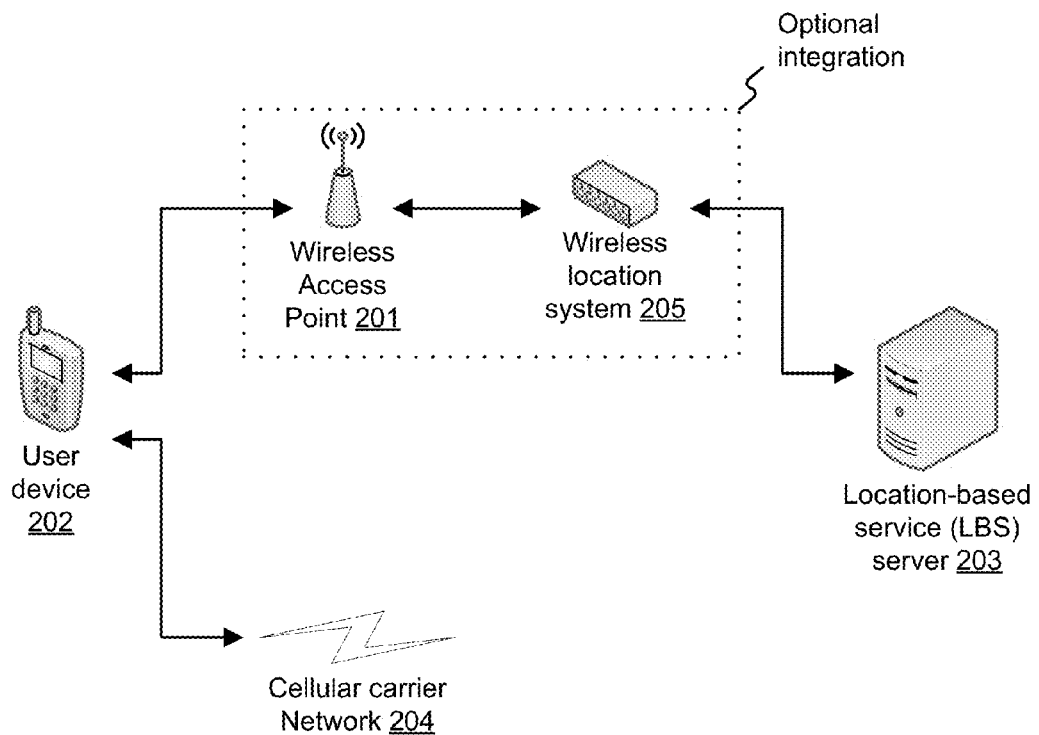
FIG. 2: Example geo-location identification system components

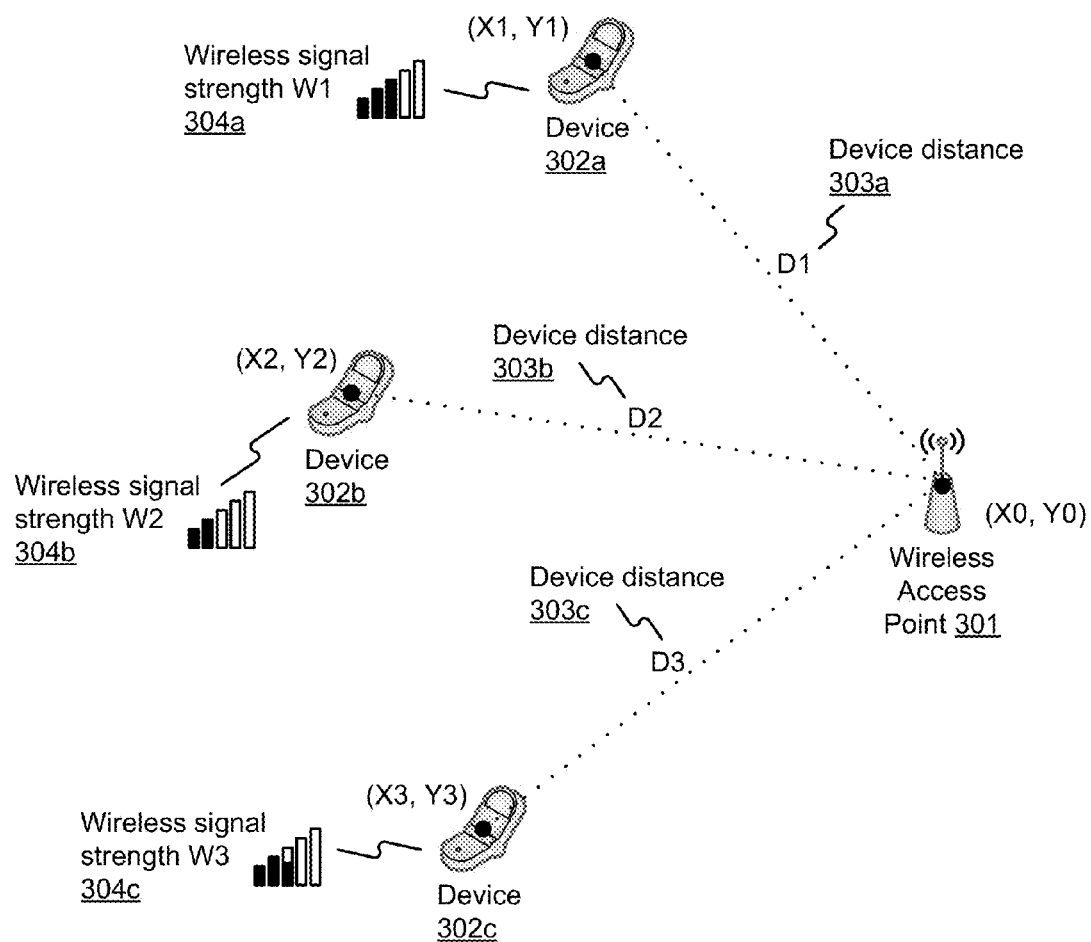
FIG. 3A: Wireless access point geo-location identification example

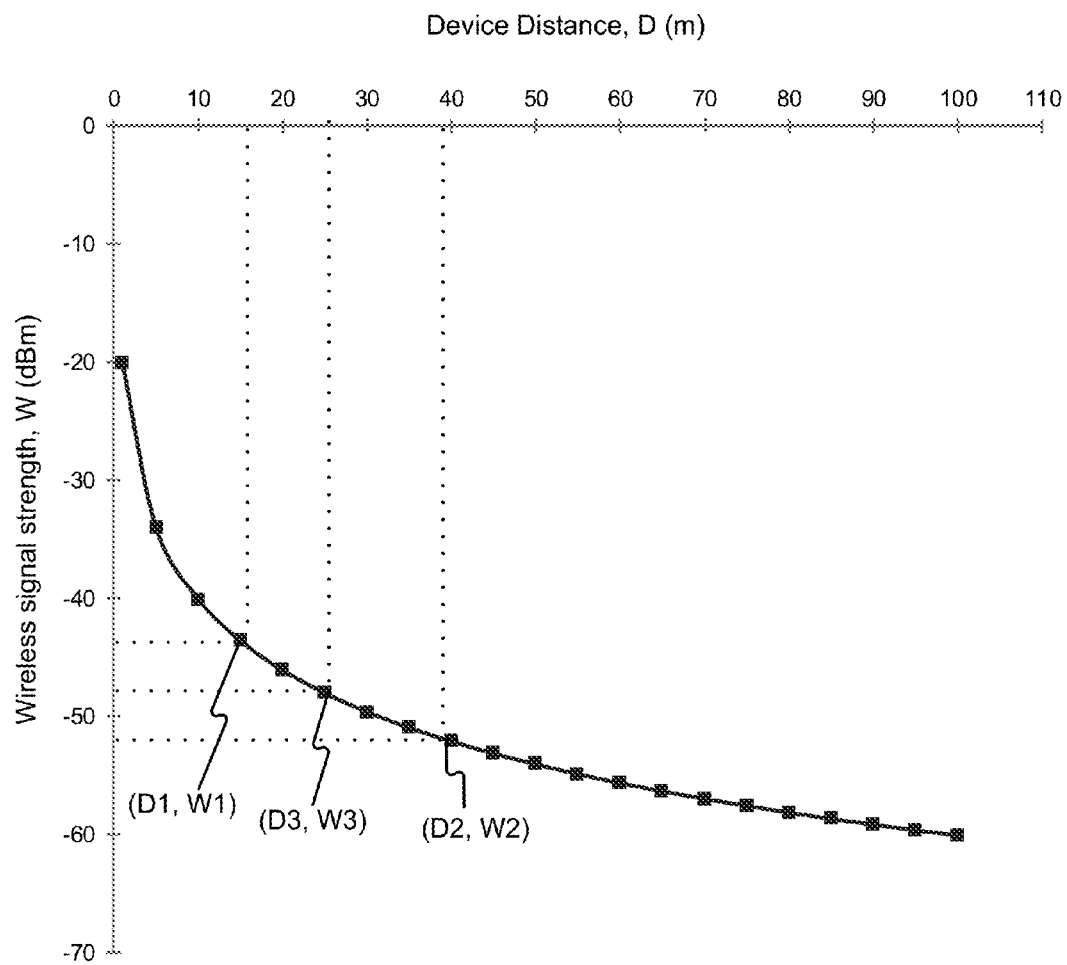
FIG. 3B: Wireless access point geo-location identification example

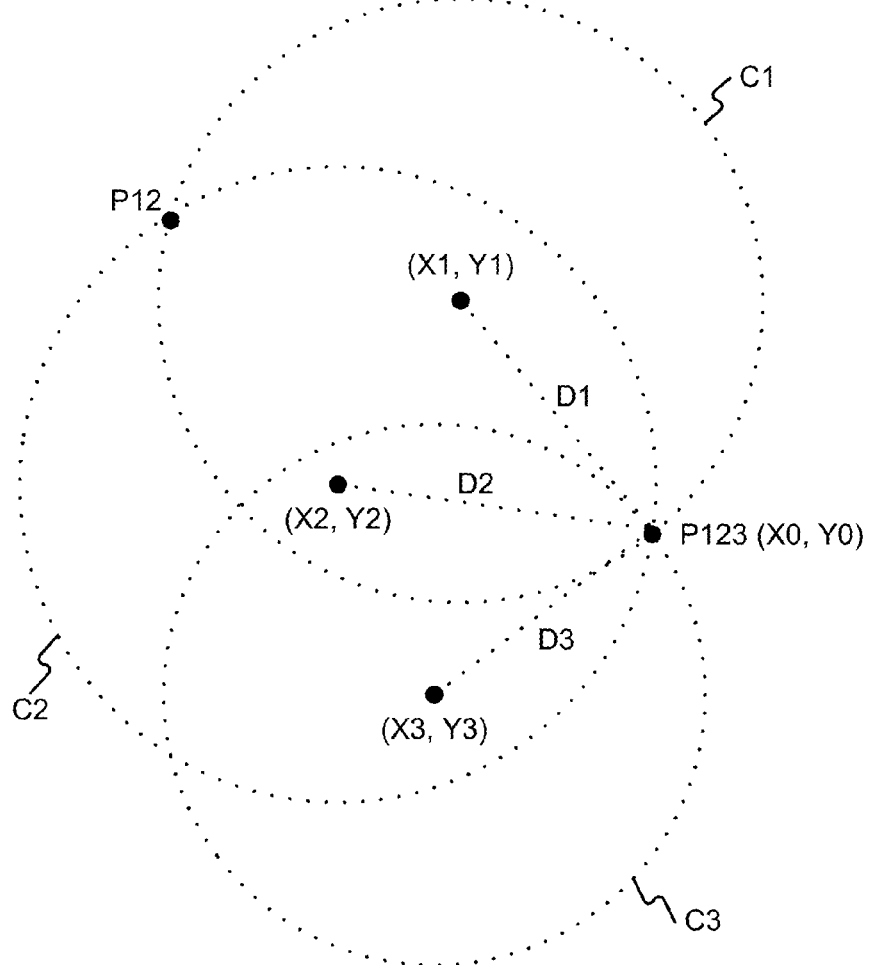
FIG. 3C: Wireless access point geo-location triangulation example

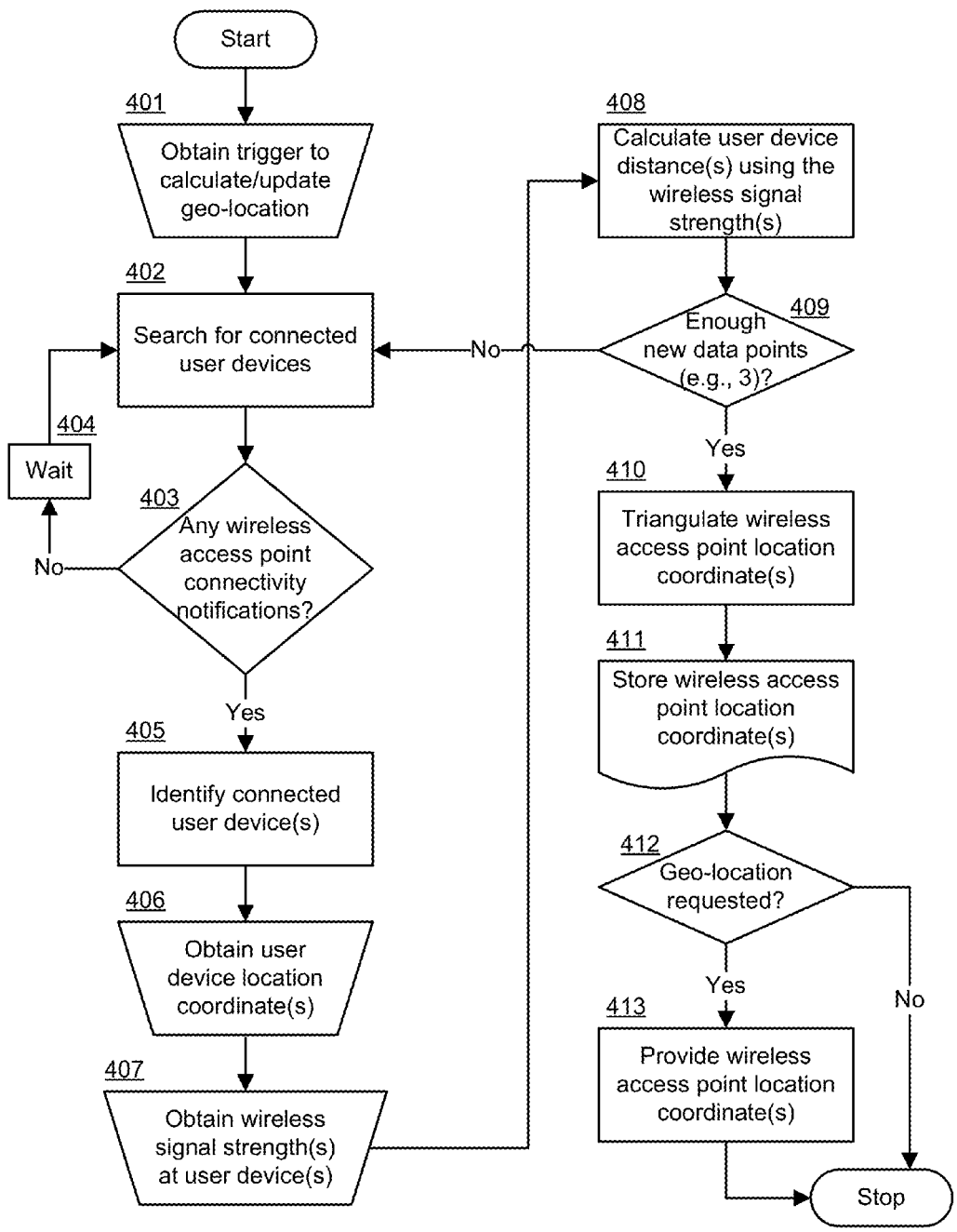
FIG. 4: Wireless access point geo-location example flowchart

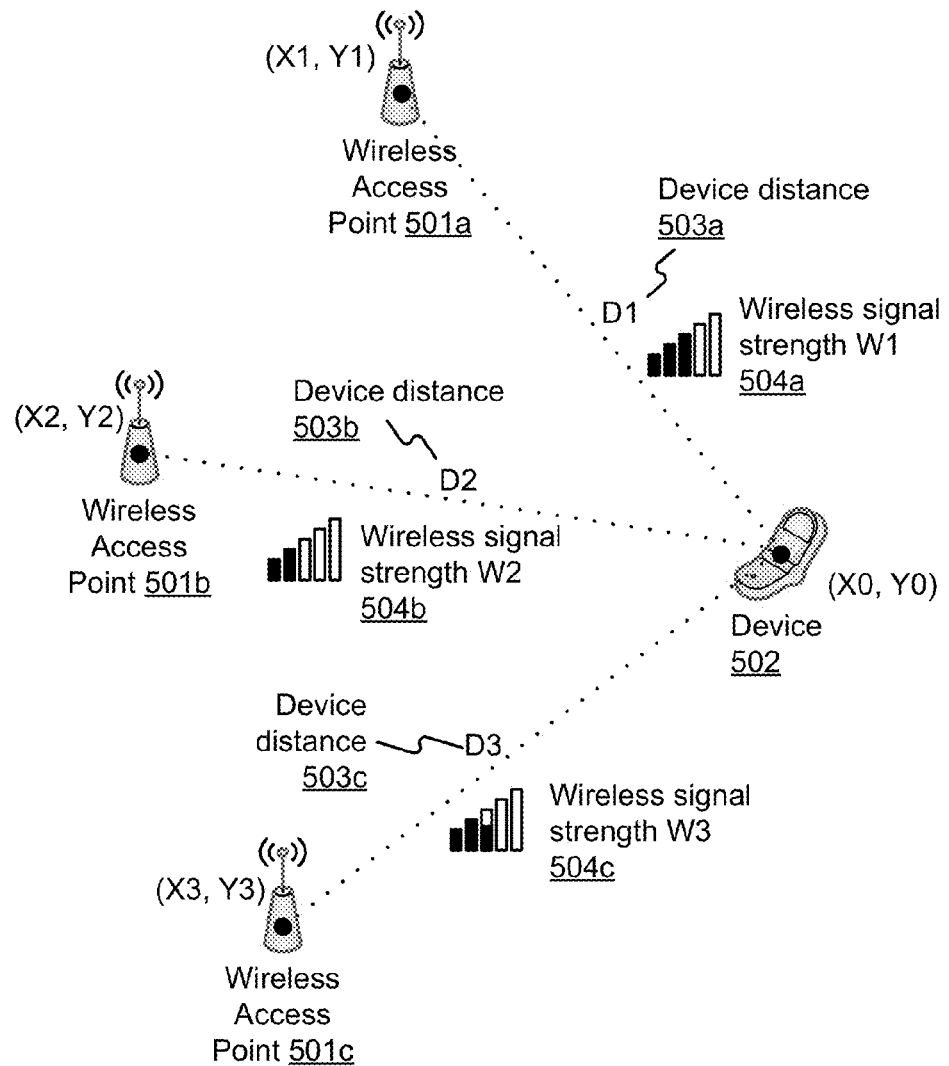
FIG. 5A: User device geo-location identification example

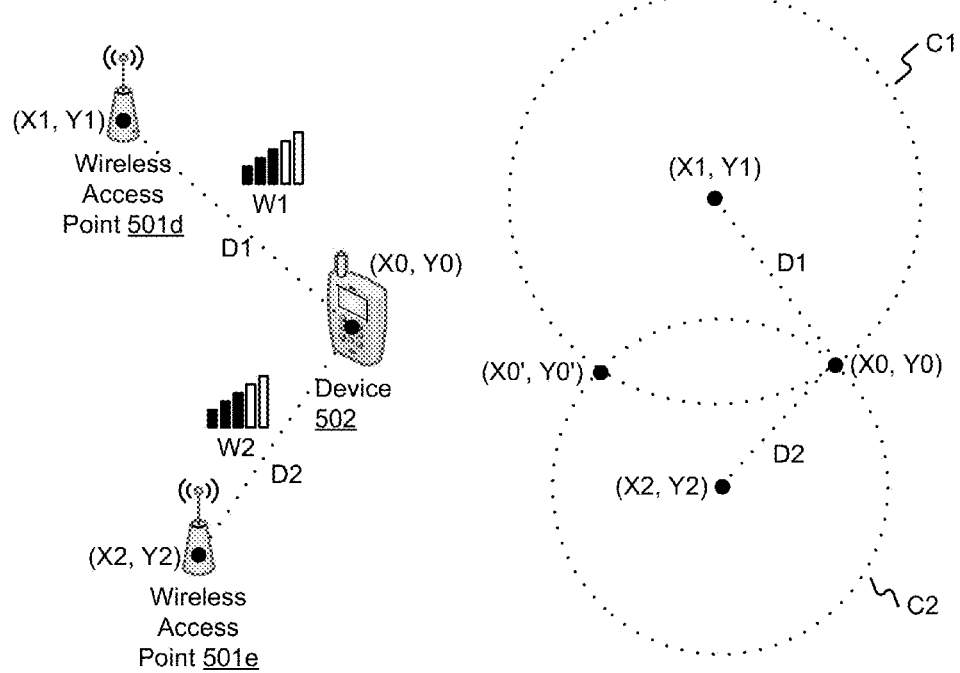
(a) Two wireless access points
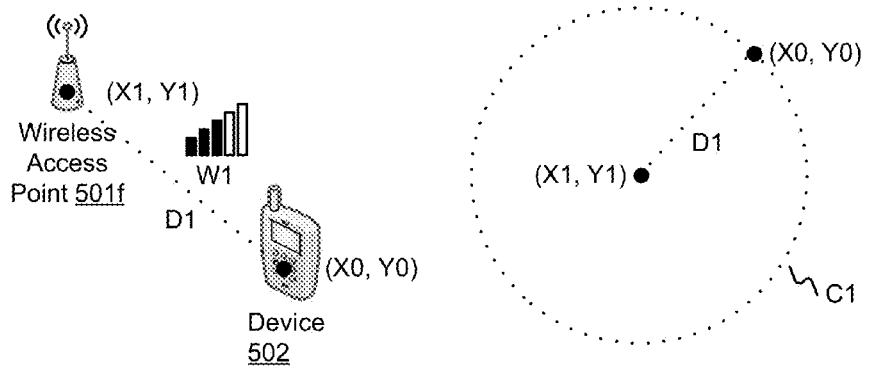
(b) One wireless access point
FIG. 5B: User device geo-location identification examples

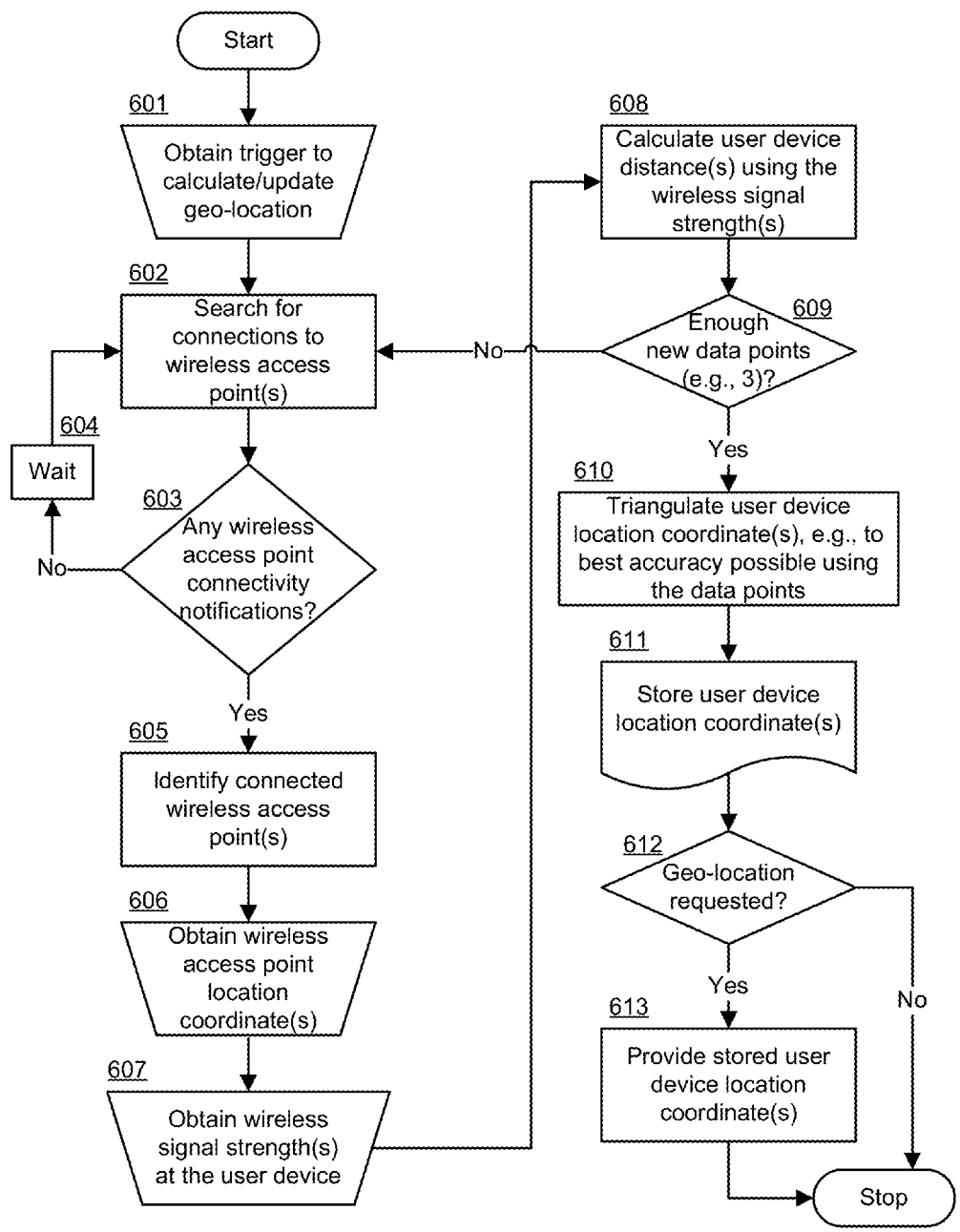
FIG. 6: User device geo-location example flowchart

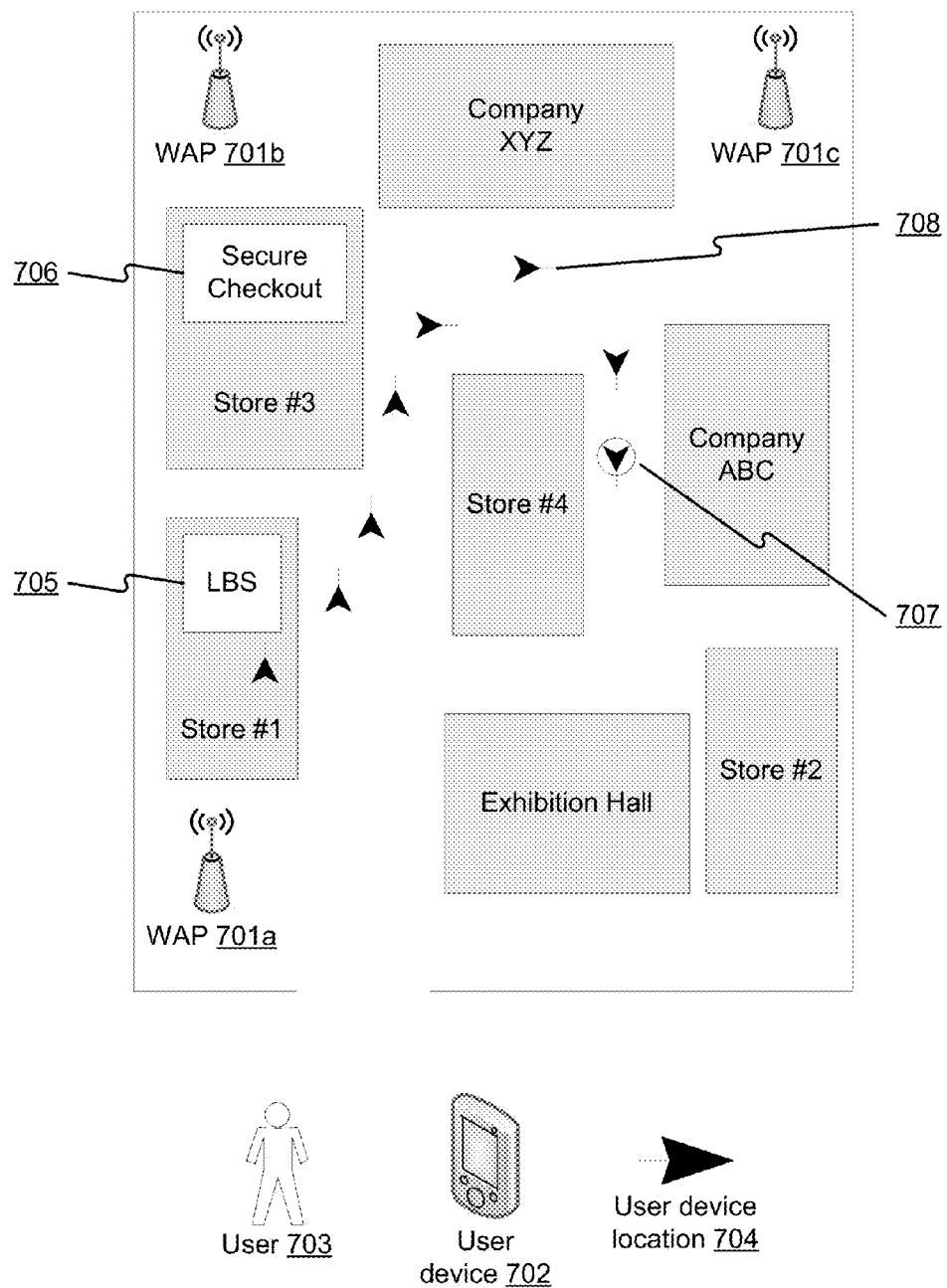
FIG. 7: User device geo-location history tracking

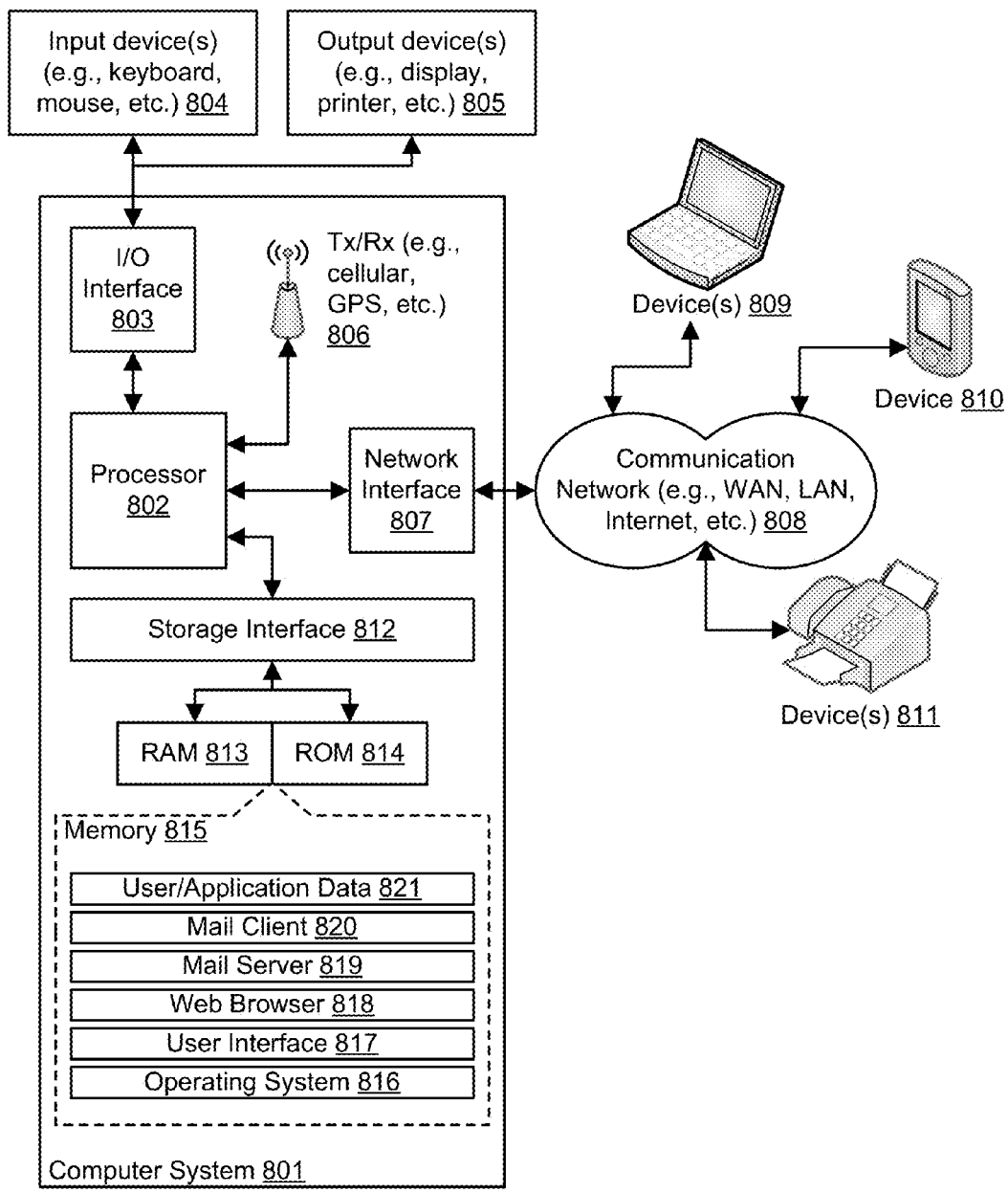
FIG. 8: Example Computer System

SYSTEMS AND METHODS FOR EFFECTIVE IDENTIFICATION OF GEO-LOCATION IN MOBILE HETNET ENVIRONMENTS

PRIORITY CLAIM

This U.S. patent application claims priority under 35 U.S.C. §119 to: India Application No. 3019/CHE/2013, filed Jul. 5, 2013. The aforementioned application is incorporated herein by reference in its entirety.

TECHNICAL FIELD

This disclosure relates generally to location services, and more particularly to systems and methods for effective identification of geo-location in mobile HetNet environments.

BACKGROUND

Heterogeneous networking ("HetNet"), in the mobile context, usually refers to the capability to provide a service for a mobile device as it switches from one network to another, e.g., from a cellular network to a wireless local area network. The 3rd Generation Partnership Project (3GPP) protocol facilitates geo-locating cellular phones connected to a cellular telecommunications network. Cellular operators, however, increasingly prefer offloading cellular traffic on to Wi-Fi™ networks. Global positioning systems (GPS) provide another mechanism for determining geo-location of devices such as a smartphone or tablet computer. Only a limited number of devices, however, support GPS. Also, GPS systems require line-of-sight signals from GPS satellites, which may not be available indoors. Some devices may be capable of connecting to both cellular networks as well as other networks, such as Wi-Fi™ networks. Device geo-location may be useful during emergencies involving a user of the device, such as fire, medical, security, or other emergencies. Device geo-location may also be useful for regulatory compliance or law enforcement purposes. Some devices execute applications that may require device geo-location to provide features or (e.g., web-based) services for the user of the device.

SUMMARY

In one embodiment, a wireless access point geo-location method is disclosed, comprising: receiving one or more wireless access point connectivity notifications associated with one or more user devices; receiving at least three: user device location coordinates associated with the one or more user devices, and wireless signal strengths associated with the one or more wireless access point connectivity notifications; calculating, via a processor, user device distances using the at least three wireless signal strengths; triangulating, via the processor, a wireless access point location coordinate using the at least three user device location coordinates and the calculated user device distances; and storing the wireless access point location coordinate.

In one embodiment, a wireless access point geo-location system is disclosed, comprising: a processor; and a memory device disposed in communication with the processor and storing processor-executable instructions, the instructions comprising instructions for: receiving one or more wireless access point connectivity notifications associated with one or more user devices; receiving at least three: user device location coordinates associated with the one or more user devices, and wireless signal strengths associated with the one or more wireless access point connectivity notifications; calculating, via a processor, user device distances using the at least three wireless signal strengths; triangulating, via the processor, a wireless access point location coordinate using the at least three user device location coordinates and the calculated user device distances; and storing the wireless access point location coordinate.

In one embodiment, a non-transitory processor-readable medium is disclosed, storing processor-executable wireless access point geo-location instructions comprising instructions for: receiving one or more wireless access point connectivity notifications associated with one or more user devices; receiving at least three: user device location coordinates associated with the one or more user devices, and wireless signal strengths associated with the one or more wireless access point connectivity notifications; calculating, via a processor, user device distances using the at least three wireless signal strengths; triangulating, via the processor, a wireless access point location coordinate using the at least three user device location coordinates and the calculated user device distances; and storing the wireless access point location coordinate.

In one embodiment, a device geo-location method is disclosed, comprising: receiving one or more wireless signal strengths associated with connectivity of a user device to one or more wireless access points; calculating, via a processor, one or more distances of the user device from the one or more wireless access points using the one or more wireless signal strengths; triangulating a user device location coordinate using: a pre-determined wireless access point location coordinate associated with at least one of the one or more wireless access points; and the calculated one or more distances of the user device from the one or more wireless access points; and storing the user device location coordinate.

In one embodiment, a device geo-location system is disclosed, comprising: a processor; and a memory device disposed in communication with the processor and storing processor-executable instructions, the instructions comprising instructions for: receiving one or more wireless signal strengths associated with connectivity of a user device to one or more wireless access points; calculating, via a processor, one or more distances of the user device from the one or more wireless access points using the one or more wireless signal strengths; triangulating a user device location coordinate using: a pre-determined wireless access point location coordinate associated with at least one of the one or more wireless access points; and the calculated one or more distances of the user device from the one or more wireless access points; and storing the user device location coordinate.

In one embodiment, a non-transitory processor-readable medium is disclosed, storing processor-executable device geo-location instructions comprising instructions for: receiving one or more wireless signal strengths associated with connectivity of a user device to one or more wireless access points; calculating, via a processor, one or more distances of the user device from the one or more wireless access points using the one or more wireless signal strengths; triangulating a user device location coordinate using: a pre-determined wireless access point location coordinate associated with at least one of the one or more wireless access points; and the calculated one or more distances of the user device from the one or more wireless access points; and storing the user device location coordinate.

It is to be understood that both the foregoing general description and the following detailed description are exemplary and explanatory only and are not restrictive of the invention, as claimed.

BRIEF DESCRIPTION OF THE DRAWINGS

The accompanying drawings, which are incorporated in and constitute a part of this disclosure, illustrate exemplary embodiments and, together with the description, serve to explain the disclosed principles.

FIG. 1 illustrates examples used for geo-location identification in mobile HetNet environments.

FIG. 2 is a block diagram of example geo-location identification system components according to some embodiments of the present disclosure.

FIGS. 3A-C illustrate example aspects of wireless access point geo-location identification according to some embodiments of the present disclosure.

FIG. 4 is an example flowchart for wireless access point geo-location in accordance with some embodiments of the present disclosure.

FIGS. 5A-B illustrate example aspects of user device geo-location identification according to some embodiments of the present disclosure.

FIG. 6 is an example flowchart for user device geo-location in accordance with some embodiments of the present disclosure.

FIG. 7 is a block diagram illustrating an example of user device geo-location history tracking in accordance with some embodiments of the present disclosure.

FIG. 8 is a block diagram of an exemplary computer system for implementing embodiments consistent with the present disclosure.

DETAILED DESCRIPTION

Exemplary embodiments are described with reference to the accompanying drawings. Wherever convenient, the same reference numbers are used throughout the drawings to refer to the same or like parts. While examples and features of disclosed principles are described herein, modifications, adaptations, and other implementations are possible without departing from the spirit and scope of the disclosed embodiments. It is intended that the following detailed description be considered as exemplary only, with the true scope and spirit being indicated by the following claims.

FIG. 1 illustrates examples used for geo-location identification in mobile HetNet environments. In some embodiments, a user device, e.g., 102a-c, may have connectivity to a wireless access point, e.g., 101a-c. The wireless access point may be a computer, router, switch, hub, universal serial bus (USB) stick, or any other device capable of receiving and transmitting data (e.g., Internet Protocol (IP) packets, wireless local-area network (WLAN) packets, etc.). Here, "connectivity" does not necessarily require that a wireless session be initiated between the wireless access point and the user device; instead, it may be sufficient that data (e.g., IP/WLAN packets) can be successfully transmitted from the user device to the wireless access point, or from the wireless access point to the user device. For example, if a user device is scanning for wireless networks and is able to detect a service set identifier (SSID) associated with a wireless local-area network facilitated by the wireless access point, the user device and the wireless access point may be said to have connectivity to each other. In such examples, the SSID may be used to generate a wireless access point connectivity notification.

In some embodiments, a user device, e.g, 102a-c, may utilize geo-location identification services for a variety of purposes, of which three examples are provided below. With reference to FIG. 1(a), in some embodiments, a user device 102a may require a location-based service, e.g., provided by a web-based application server. Examples of such services include mapping services, locating nearby services (e.g., restaurants, shops, etc.), or the like. The user device 102a may provide a service request 110a for a service provider, e.g., LBS server 103a. The user device may send the service request 110a to the wireless access point 101a with which it has connectivity, and the wireless access point 101a may forward the service request 110a to the LBS server 103a. To process the service request 110a, the LBS server 103a may provide a geo-location request 111a to the wireless access point 101a (and/or for the user device 102a). The user device 102a and/or wireless access point 101a may determine one or more location coordinates (e.g., of the user device, of the wireless access point, etc.) to provide for the LBS server 103a. In some implementations, a wireless location system 105a (e.g., that may be separate or integrated with the user device or the wireless access point) may perform, or assist in the performance of, the determination of location coordinate(s) for the user device 102a and/or the wireless access point 101a. The wireless access point 101a and/or wireless location system 105a may provide the determined location coordinate(s) 112a for the LBS server 103a. Using the geo-location of the user device 102a and/or the wireless access point 101a, the LBS server 103a may provide the requested location-based service.

With reference to FIG. 1(b), in some embodiments, a user device 102b may make an emergency call, e.g., in case of a medical emergency, fire emergency, etc. For example, the user device 102b may initiate a voice-over-IP (VoIP) call 110b via a wireless access point 101b with which it has connectivity, and the wireless access point 101b may forward VoIP call data packets to a '911' operator/service 103b. The wireless access point 101b may forward VoIP packets to-and-from the user device 102b, and to-and-from an emergency operator/service, e.g., a '911' operator/service 103b. In some embodiments, the '911' operator/service 103b may be implemented as a phone, a server system, a computer, or the like. In response to an emergency call (e.g., a VoIP call), the '911' operator/service 103b may provide a geo-location request 111b for the wireless access point 101b (and/or for the user device 102b). The user device 102b and/or wireless access point 101b may determine one or more location coordinates (e.g., of the user device, of the wireless access point, etc.) to provide for the LBS server 103b. In some implementations, a wireless location system 105b (e.g., that may be separate or integrated with the user device or the wireless access point) may perform, or assist in the performance of, the determination of location coordinate(s) for the user device 102b and/or the wireless access point 101b. The wireless access point 101b and/or wireless location system 105b may provide the determined location coordinate(s) 112b for the '911' operator/service 103b. Using the geo-location of the user device 102b and/or the wireless access point 101b, the '911' operator/service 103b may be able to facilitate fast, targeted, efficient, and responsive emergency service.

With reference to FIG. 1(c), in some embodiments, a user device 102c may make a service request, e.g., a checkout request at a store, an account access request at a bank, a data access request at a secure data repository, or the like. For example, the user device 102c may require to initiate a response 110c to a service request, initiated by a LEA (Law Enforcement Agency) application, via a wireless access point 101c with which it has connectivity, and the wireless access point 101c may forward the service request to a compliance server 103c. In some embodiments, the compliance server 103c may perform one or more checks for compliance with security protocols, local system rules, legal regulations, laws, or ordinances, or the like. To process the service request 110*c*, the compliance server 103*c* may provide a geo-location request 111*c* for the wireless access point 101*c* (and/or for the user device 102*c*). The user device 102*c* and/or wireless access point 101*c* may determine one or more location coordinates (e.g., of the user device, of the wireless access point, etc.) to provide for the compliance server 103*c*. In some implementations, a wireless location system 105*c* (e.g., that may be separate or integrated with the user device or the wireless access point) may perform, or assist in the performance of, the determination of location coordinate(s) for the user device 102*c* and/or the wireless access point 101*c*. The wireless access point 101*c* and/or wireless location system 105*c* may provide the determined location coordinate(s) 112*c* for the compliance server 103*c*. Using the geo-location of the user device 102*c* and/or the wireless access point 101*c*, the compliance server 103*c* may be able to, e.g., authenticate the user, ensure compliance with applicable security protocols, local system rules, legal regulations, laws, or ordinances, etc., and facilitate processing the service request 110*c*.

FIG. 2 is a block diagram of example geo-location identification system components according to some embodiments of the present disclosure. A geo-location identification system may be implemented using a variety of system components, and example arrangement of which is described below. In some embodiments, a user device 202 may have connectivity with a wireless access point 201, as well as a cellular tower via a cellular carrier network 204. In some embodiments, a separate wireless location system 205 may be utilized to determine geo-location coordinates for the wireless access point 201 and/or user device 202. In some embodiments, the wireless location system may be integrated into the wireless access point 201. In some embodiments, the user device 202, the wireless access point 201, and/or a service provider (e.g., LBS server 203) may, individually or jointly, perform the operations or procedures associated with the wireless location system 205. The description below with reference to FIG. 8 provides example devices that may serve as the user device 202, wireless access point 201, wireless location system 205, and LBS server 203. Additional examples of such devices are noted throughout the disclosure.

FIGS. 3A-C illustrate example aspects of wireless access point geo-location identification according to some embodiments of the present disclosure. With reference to FIG. 3A, in some embodiments, geo-location identification may be performed for a wireless access point 301. For example, the wireless access point 301 may operate according to an Access Network Query Protocol (ANQP) for WiFi™ Hotspot 2.0 based on the IEEE 802.11u standard. The wireless access point 301 may be able to store wireless access point location coordinates. For example, the wireless access point location coordinates may be stored in a location configuration information (LCI) format which may include, without limitation, latitude, longitude, and/or altitude information, optionally along with resolution or uncertainty indicators for each. As another example, the wireless access point location coordinates may be stored in a civic format which may include, without limitation, door number, street address, suite number, city, state, country, zip code, etc.

In some embodiments, a user device, e.g., 302*a-c*, may have connectivity with the wireless access point 301. In the non-limiting example illustrated in FIG. 3A, the wireless access point 301 may exist at a location coordinates (X0, Y0) that may not yet have been determined, or that may need updating because some threshold amount of time has elapsed since the last time the location coordinates (X0, Y0) were determined. Device 302*a* may exist at a position (X1, Y1), and may exist at a device distance D1, 303*a*, from the wireless access point 301. According to the device distance D1, among other factors, a wireless network facilitated by the wireless access point 301 may have wireless signal strength W1, 304*a*, at the device 302*a*. For example, the wireless access point 301 may be broadcasting a wireless network with a particular SSID, and the strength of that wireless network at a distance D1 from the wireless access point 301 (e.g., at the device 302*a*) may be W1. The wireless signal strength W1 may be, for example, measured in Watts, Volts, dBm, dB, or like units. Similarly, device 302*b* may exist at a position (X2, Y2), and may exist at a device distance D2, 303*b*, from the wireless access point 301. According to the device distance D2, among other factors, a wireless network facilitated by the wireless access point 301 may have wireless signal strength W2, 304*b*, at the device 302*b*. Also, device 302*c* may exist at a position (X3, Y3), and may exist at a device distance D3, 303*c*, from the wireless access point 301. According to the device distance D3, among other factors, a wireless network facilitated by the wireless access point 301 may have wireless signal strength W3, 304*c*, at the device 302*a*. In some embodiments, devices 302*a-c* may all refer to the same device, but located at three different positions (location coordinates (X1, Y1), (X2, Y2), and (X3, Y3)) at three different instances of time. In the example of FIG. 3A, each location is defined in terms of two-dimensional Cartesian coordinates (X and Y). However, it is to be understood that any spatial location coordinate system may be used with dimensionality ranging from a single dimension (e.g., (X); (θ); etc.) to three dimensions (e.g., (X, Y, Z); (R, θ, φ); etc.).

As discussed above, the wireless signal strengths W1, W2, and W3 may vary according to the device distances D1, D1, and D3, among other factors. FIG. 3B, illustrates an example graph depicting the dependence that a wireless signal strength W (measured in this example in dBm) may have on device distance D (measured in this example in m), assuming that other factors are held constant when obtaining the data points to generate the graph of FIG. 3B. For example, the relationship between wireless signal strength and device distance may be described using the Friis transmission equation:

$$P_r(\text{dBm}) = P_t(\text{dBm}) + G_t(\text{dB}) + G_r(\text{dB}) + 20\log_{10}\left(\frac{\lambda(\text{m})}{4\pi R(\text{m})}\right) \quad (1)$$

In equation (1), $P_r$ is the power available at a receiving antenna (e.g., at a user device) in dBm, $P_t$ is the power output by a transmitting antenna (e.g., at a wireless access point) in dBm, $G_t$ and $G_r$ are antenna gains of the transmitting and receiving antenna respectively, in dB, λ is the wavelength of the wireless transmission, in meters, and R is the distance between the antennas, in meters.

In the example of FIG. 3B, D1<D3<D2, and this relationship is represented in the relationship between the wireless signal strengths W1>W3>W2. Measuring the wireless signal strength W at a user device, and using the measured wireless signal strength as a lookup variable in to the graph of FIG. 3B can determine the device distance D. In this example, the wireless access point 301 has been assumed to provide isotropic performance. In alternative embodiments, however, the yaw and tilt angles with respect to the horizontal earth may have an effect on the wireless signal strength. In such embodiments, more detailed data gathering may be required to determine a device distance from the wireless signal strength, yaw angle, and pitch angle. In general, it is to be understood that the disclosure contemplates that any number of variables other than device distance may affect the wireless signal strength measured at a user device, and the effect of those variables may be considered in ensuring that a device distance can be accurately determined by measuring the wireless signal strength and those variables. For example, variables such as roll, pitch, and yaw angles of the user device and/or the wireless access point may be measured using accelerometers, gyroscopes, magnetometers, etc. included in the user device and/or the wireless access point.

With reference to FIG. 3C, the location coordinates of a wireless access point 301 according to FIG. 3A (represented as P123 (X0, Y0) in FIG. 3C) can be determined from measuring wireless signal strengths W1, W2, and W3 at the three user device locations (X1, Y1), (X2, Y2), and (X3, Y3). The device distances D1, D2, and D3 can be determined from the wireless signal strength. Thus, FIG. 3C depicts the geometrical configuration in two-dimensions Cartesian coordinates corresponding to the device configuration of FIG. 3A. A triangulation method corresponding to this configuration is explained below. To determine the wireless access point location coordinates (X0, Y0), it can be first recognized that the point P123 (X0, Y0) lies at the intersection of all three circles, C1, C2, and C3, defined respectively by the locations (X1, Y1), (X2, Y2), and (X3, Y3) of the user devices and their corresponding device distances D1, D2, and D3 from the wireless access point 301. Thus:

$$(X0-X1)^2+(Y0-Y1)^2=D_1^2$$

$$(X0-X2)^2+(Y0-Y2)^2=D_2^2$$

$$(X0-X3)^2+(Y0-Y3)^2=D_3^2 \quad (2)$$

A triangulation method may proceed as follows. For any of the two circles, e.g., C1 and C2, they must intersect at two points, P12 and P123. One of these two points will correspond to the actual location of the wireless access point 301. The location coordinates of the points P12 and P123 can be determined by solving the following set of equations for X and Y:

$$(X-X1)^2+(Y-Y1)^2=D_1^2$$

$$(X-X2)^2+(Y-Y2)^2=D_2^2 \quad (3)$$

Once the location coordinates for P12 and P123 are determined, one must be eliminated. In theory, the location coordinates for P12 will not satisfy the equation below, whereas the location coordinates for P123 will:

$$(X-X3)^2+(Y-Y3)^2=D_3^2 \quad (4)$$

By plugging in the location coordinates for P12 and P123 and X and Y in equation (3) above, and determining whether the equation (3) is satisfied, the point P12 can be eliminated from consideration, leaving behind only the location coordinates for P123 as (X0, Y0), the location coordinates of the wireless access point 301.

It is to be understood that the triangulation method above is exemplary only and non-limiting; the triangulation method utilized may vary according to the number of devices, dimensionality of coordinate system, and type of coordinate system. In general, any triangulation method known to one of ordinary skill in the art is contemplated by this disclosure.

It is also to be understood that although the examples above describe the location coordinates in terms of a location configuration information (LCI) format including variables like latitude, longitude, and/or altitude information, the wireless access point location coordinates may be stored in any other format, including, for example, a civic format which may include, without limitation, door number, street address, suite number, city, state, country, zip code, etc. For example, after the triangulation process, the (X0, Y0) location coordinates may be converted into the civic format by using the location coordinates (X0, Y0) as lookup variables into a database to retrieve the corresponding location in a civic format. If the location coordinates (X0, Y0) in civic format are later requested for triangulating the location coordinates of another device, a reverse lookup may be performed, whereby location coordinates in LCI format may be retrieved corresponding to the location in civic format. In general, it is to be understood that conversion to-and-from any location format may be performed at any stage in any processes disclosed herein.

FIG. 4 is an example flowchart for wireless access point geo-location in accordance with some embodiments of the present disclosure. In some embodiments, a user device, a wireless access point, a wireless location system, and/or a service provider (e.g., a server) may, individually or jointly, perform the operations or procedures associated with the flowchart for wireless access point geo-location. In some embodiments, the method may begin by obtaining a trigger to calculate or update a wireless access point location coordinate, 401. Example triggers include, without limitation: a new wireless connectivity between a user device and the wireless access point; a new wireless connectivity notification; a lapse of time beyond a pre-determined threshold (e.g., 10 seconds, 5 minutes, etc.) after the prior calculation or update of a wireless access point location coordinate; a request by a user device, wireless access point, wireless location system, or service provider; or the like. Such triggers may be obtained as data over via a wireless connection; as a clock signal; as a signal generated internally by the device performing a part of the computations described by the flowchart of FIG. 4; or the like. The trigger may cause a search for user devices that are connected to the wireless access point, 402. For example, the protocols and procedures used in WiFi™ technology to identify wireless SSIDs may be utilized for the search. If there are no wireless connectivity notifications (e.g., indicating that there are no user devices with connectivity to the wireless access point), see 403, option "No," after a wait 404, the search may be done once more for connected user devices.

If at least one wireless connectivity notification is obtained, see 403, option "Yes," the connected user device(s) may be identified, 405. User device location coordinate(s) corresponding to the identified user device(s) may be obtained, 406, e.g., from the user device(s). For example, the user device(s) may have obtained or determined the user device location coordinate(s) using the 3GPP protocol (in case the user device is a cellular device), Global Positioning System (GPS), or the like. For example, for a user device that is capable of using the 3GPP long-term evolution (LTE) standard for wireless communication, the user device may obtain its user device location coordinate(s) using a mobility management entity (MME) and an electronic serving mobile location center (eSMLC) through its cellular connection over the LTE interface. Also, wireless signal strengths associated with the connectivity of each of the user devices may be obtained, 407, e.g., from the user device(s). Using the wireless signal strengths (and any other data that may be needed), the user device distance(s) of the user device(s) from the wireless access point may be calculated, 408, e.g., using a graph, look-up table, or formula representative of a relationship such as in FIG. 3B. In some embodiments, if, for example, the geo-location is being updated, it may be that only a single new data point (e.g., only one pair of wireless signal strengths and associated user device location coordinates) is needed to perform the update, and that new data point may be used with previously obtained data points to perform triangulation of the wireless access point location coordinates. In alternate embodiments, up to three new data points may be obtained. In further embodiments, data points obtained may be screened or rejected if the values of the wireless signal strengths and/or user device location coordinates are similar to previously obtained values (e.g., by determining whether the difference in value is less than a pre-determined threshold). Accordingly, in some embodiments, more than three new data points may be obtained. If an insufficient number of data points have been collected thus far, see 409, option "No," the steps 402-408 may be repeated until a sufficient number of data points have been collected. Accordingly, a table of data points may be generated similar to the example Table I provided below:

TABLE I

Data for triangulating wireless access point location coordinate(s)

| Timestamp | UD Latitude | UD Longitude | SSID | Strength (dBm) |
|---|---|---|---|---|
| 08:00:35^ | 23.24345 | 08.89083 | WT_T1_B_1 | −4.0984 |
| 08:12:55* | 23.90988 | 08.00013 | WT_T1_B_5 | −12.9038 |
| 08:12:58*# | 23.90988 | 08.00013 | WT_T1_B_11 | −12.9033 |
| 08:13:16# | 23.34564 | 08.38944 | WT_T1_B_1 | −33.0218 |
| 08:14:01# | 23.20322 | 08.90436 | WT_T1_B_6 | −9.6276 |

^Data point too old, because wireless access point is mobile (rejected)
*Similar to each other (older data point rejected)
Data point used for triangulation Once a sufficient number of new data points have been collected, see 409, option "Yes," triangulation of wireless access point location coordinate(s) may be performed using the new data points and/or previously obtained data points, 410. As an example, the method described above in relation to FIG. 3C may be used for triangulation. The triangulated wireless access point location coordinate(s) may be stored, 411, for example, according to an Access Network Query Protocol (ANQP) for WiFi™ Hotspot 2.0 based on the IEEE 802.11u standard. The triangulated wireless access point location coordinate(s) may be stored at the wireless access point, or one of the user device(s), or a wireless location system, or at a service provider (e.g., at a server), or another system component. In some embodiments, a location-based service, emergency service operator, compliance manager, etc. may request the triangulated wireless access point location coordinate(s), 412. To process the request, the triangulated wireless access point location coordinate(s) may be provided, e.g., over the wireless network connecting the wireless access point and the requesting device, 413.

FIGS. 5A-B illustrate example aspects of user device geo-location identification according to some embodiments of the present disclosure. With reference to FIG. 5A, in some embodiments, geo-location identification may be performed for a device 502, e.g., a user device. For example, the device 502 may have connectivity to one or more wireless access points, e.g., 501*a-c*, e.g., using WiFi™ Hotspot 2.0 based on the IEEE 802.11u standard. The wireless access points, e.g., 501*a-c*, may be able to store wireless access point location coordinates. For example, the wireless access point location coordinates may be stored in a location configuration information (LCI) format which may include, without limitation, latitude, longitude, and/or altitude information, optionally along with resolution or uncertainty indicators for each. As another example, the wireless access point location coordinates may be stored in a civic format which may include, without limitation, door number, street address, suite number, city, state, country, zip code, etc.

In some embodiments, the user device 502 may exist at a location coordinates (X0, Y0) that may not yet have been determined, or that may need updating because some threshold amount of time has elapsed since the last time the location coordinates (X0, Y0) were determined. Wireless access point 501*a* may exist at a position (X1, Y1), and may exist at a device distance D1, 503*a*, from the device 502. According to the device distance D1, among other factors, a wireless network facilitated by the wireless access point 501*a* may have wireless signal strength W1, 504*a*, at the device 302*a*. For example, the wireless access point 501*a* may be broadcasting a wireless network with a particular SSID, and the strength of that wireless network at a distance D1 from the wireless access point 501*a* (e.g., at the device 502) may be W1. The wireless signal strength W1 may be, for example, measured in Watts, Volts, dBm, dB, or like units. Similarly, wireless access point 501*b* may exist at a position (X2, Y2), and may exist at a device distance D2, 503*b*, from the device 502. According to the device distance D2, among other factors, a wireless network facilitated by the wireless access point 501*b* may have wireless signal strength W2, 504*b*, at the device 502. Also, wireless access point 501*c* may exist at a position (X3, Y3), and may exist at a device distance D3, 503*c*, from the device 502. According to the device distance D3, among other factors, a wireless network facilitated by the wireless access point 501*c* may have wireless signal strength W3, 504*c*, at the device 502. In some embodiments, wireless access points 501*a-c* may all refer to the same wireless access point (e.g., a mobile wireless access point), but located at three different positions (location coordinates (X1, Y1), (X2, Y2), and (X3, Y3)) at three different instances of time. In the example of FIG. 5A, each location is defined in terms of two-dimensional Cartesian coordinates (X and Y). However, it is to be understood that any spatial location coordinate system may be used with dimensionality ranging from a single dimension (e.g., (X); (θ); etc.) to three dimensions (e.g., (X, Y, Z); (R, θ, φ); etc.).

With reference to FIG. 5B, in some embodiments, fewer than three wireless access points may be available for determining the user device location coordinate(s) for a user device. For example, with reference to FIG. 5B(a), only two wireless access points, 501*d-e*, may be available. Wireless access point 501*d* may exist at a position (X1, Y1), and may exist at a device distance D1 from the device 502. According to the device distance D1, among other factors, a wireless network facilitated by the wireless access point 501*d* may have wireless signal strength W1 at the device 502. Wireless access point 501*e* may exist at a position (X2, Y2), and may exist at a device distance D2 from the device 502. According to the device distance D2, among other factors, a wireless network facilitated by the wireless access point 501*e* may have wireless signal strength W2 at the device 502. Following the example triangulation method as described in the discussion above with reference to FIG. 3C, the location coordinate(s) for the user device 502 can be narrowed down to one of two points, (X0, Y0) and (X0', Y0'), which are the points of intersection of circles C1 and C2 defined by using the location coordinates (X1, Y1) and (X2, Y2) as centers of the circles C1 and C2, respectively, and device distances D1 and D2 as radii of the circles C1 and C2, respectively. In case a request for the location of the device 502 is obtained, one or both of the location coordinates (X0, Y0) and (X0', Y0') may be provided, and/or the location coordinates (X1, Y1) and (X2, Y2) of the wireless access points 501*d-e* may be provided. In some embodiments, the center of the line connecting the points (X0, Y0) and (X0', Y0') may be provided with an uncertainty indicator as half the distance between the two points.

With reference to FIG. 5B(b), only one wireless access point, 501f, may be available. Wireless access point 501f may exist at a position (X1,Y1), and may exist at a device distance D1 from the device 502. According to the device distance D1, among other factors, a wireless network facilitated by the wireless access point 501f may have wireless signal strength W1 at the device 502. In such an embodiment, the location coordinate(s) (X0, Y0) for the user device 502 can be narrowed down to any point lying on the circumference of a circle C1 defined by using the location coordinates (X1,Y1) as the center of the circles C1, and device distance D1 as radius of the circles C1. In case a request for the location of the device 502 is obtained, one or both of the location coordinates (X0, Y0) and (X1, Y1) may be provided. In some embodiments, D1 may be provided as an uncertainty indicator (e.g., the uncertainty in position may be ±D1).

It is to be understood that although the examples above describe the location coordinates in terms of a location configuration information (LCI) format including variables like latitude, longitude, and/or altitude information, the wireless access point location coordinates may be stored in any other format, including, for example, a civic format which may include, without limitation, door number, street address, suite number, city, state, country, zip code, etc. For example, after the triangulation process, the (X0, Y0) location coordinates may be converted into the civic format by using the location coordinates (X0, Y0) as lookup variables into a database to retrieve the corresponding location in a civic format.

FIG. 6 is an example flowchart for user device geo-location in accordance with some embodiments of the present disclosure. In some embodiments, a user device, a wireless access point, a wireless location system, and/or a service provider (e.g., a server) may, individually or jointly, perform the operations or procedures associated with the flowchart for wireless access point geo-location. In some embodiments, the method may begin by obtaining a trigger to calculate or update a user device location coordinate, 601. Example triggers include, without limitation: a new wireless connectivity between a user device and a wireless access point; a new wireless connectivity notification; a lapse of time beyond a pre-determined threshold (e.g., 10 seconds, 5 minutes, etc.) after the prior calculation or update of a user device location coordinate; a request by a user device, wireless access point, wireless location system, or service provider; or the like. Such triggers may be obtained as data over via a wireless connection; as a clock signal; as a signal generated internally by the device performing a part of the computations described by the flowchart of FIG. 6; or the like. The trigger may cause a search for connections between the user device and wireless access points, 602. For example, the protocols and procedures used in WiFi™ technology to identify wireless SSIDs may be utilized for the search. If there are no wireless connectivity notifications (e.g., indicating that the user device does not have connectivity to any wireless access point), see 603, option "No," after a wait 604, the search may be done once more for connectivity to wireless access points.

If at least one wireless connectivity notification is obtained, see 603, option "Yes," the connected wireless access point(s) may be identified, 605. Wireless access point location coordinate(s) corresponding to the identified wireless access point(s) may be obtained, 606, e.g., from the wireless access point(s). For example, the wireless access point(s) may have previously determined the wireless access point location coordinate(s) using the methods described above in relation to FIGS. 3A-C, 4, or obtained them from a system component that performed such methods. Also, wireless signal strengths associated with the connectivity of each of the wireless access points may be obtained, 607, e.g., from the user device. Using the wireless signal strengths (and any other data that may be needed), the user device distance(s) from the wireless access point(s) may be calculated, 608, e.g., using a graph, look-up table, or formula representative of a relationship such as in FIG. 3B. In some embodiments, if, for example, the geo-location is being updated, it may be that only a single new data point (e.g., only one pair of wireless signal strengths and associated wireless access point location coordinates) is needed to perform the update, and that new data point may be used with previously obtained data points to perform triangulation of the device location coordinates. In alternate embodiments, up to three new data points may be obtained. In further embodiments, data points obtained may be screened or rejected if the values of the wireless signal strengths and/or wireless access point location coordinates are similar to previously obtained values (e.g., by determining whether the difference in value is less than a pre-determined threshold). Accordingly, in some embodiments, more than three new data points may be obtained. If an insufficient number of data points have been collected thus far, see 609, option "No," the steps 602-608 may be repeated until a sufficient number of data points have been collected. Accordingly, a table of data points may be generated similar to the example Table II provided below:

TABLE II

Data for triangulating user device location coordinate(s)

| Timestamp | WAP Latitude | WAP Longitude | SSID | Strength (dBm) |
|---|---|---|---|---|
| 12:23:04^ | 12.12773 | 75.48301 | WT_T1_B_1 | −77.0980 |
| 12:34:56* | 12.83814 | 77.66121 | WT_T1_B_1 | −65.2345 |
| 12:34:57*# | 12.83814 | 77.66121 | WT_T1_B_1 | −65.2321 |
| 12:34:58# | 12.98974 | 75.34298 | WT_T1_B_2 | −56.9087 |
| 12:35:01# | 12.78654 | 72.23455 | WT_T1_B_6 | −9.3445 |

^Data point too old, because user device is mobile (rejected)
*Similar to each other (older data point rejected)
Data point used for triangulation Once a sufficient number of new data points have been collected, see 609, option "Yes," triangulation of user device location coordinate(s) may be performed using the new data points and/or previously obtained data points, 610. As an example, the methods described above in relation to FIGS. 3C, 5A-B may be used for triangulation. The triangulated user device location coordinate(s) may be stored, 611, for example, according to an Access Network Query Protocol (ANQP) for WiFi™ Hotspot 2.0 based on the IEEE 802.11u standard. The triangulated user device location coordinate(s) may stored at one of the wireless access point(s), or the user device, or a wireless location system, or at a service provider (e.g., at a server), or another system component. In some embodiments, a location-based service, emergency service operator, compliance manager, etc. may request the triangulated user device location coordinate(s), 612. To process the request, the triangulated user device location coordinate(s) may be provided, e.g., over the wireless network connecting one of the wireless access point(s) and the requesting device, 613.

FIG. 7 is a block diagram illustrating an example of user device geo-location history tracking in accordance with some embodiments of the present disclosure. In some embodiments, a user 703 may be carrying a user device 702 into an area where network connectivity is possible via wireless network(s) facilitated by wireless access points (WAPs) 701a-c. Using the methods described above with reference to FIGS.

3A-B, 4, 5A-B, and 6, the location coordinates of the user device 702 can be determined. Thus, a user device location (represented by graphical element 704) can be tracked over time. For example, a current location of the user device 707 can be determined, and stored (periodically, on-demand, or on some trigger) so as to generate a historical trace of user device locations (see, e.g., 708 for an example of a historical user device location). The current and/or historical user device locations can be used to provide location-based services (LBS), such as real-time offers in a store, coupons, weather updates, or the like (see, e.g., 705). The current and/or historical user device locations can be used to for security, compliance or regulatory purposes, e.g., during a secure checkout of shopping items in a store (see, e.g., 706).

Illustrative embodiments of the present disclosure are listed below. In one embodiment, a wireless access point geo-location method is disclosed, comprising: receiving one or more wireless access point connectivity notifications associated with one or more user devices; receiving at least three: user device location coordinates associated with the one or more user devices, and wireless signal strengths associated with the one or more wireless access point connectivity notifications; calculating, via a processor, user device distances using the at least three wireless signal strengths; triangulating, via the processor, a wireless access point location coordinate using the at least three user device location coordinates and the calculated user device distances; and storing the wireless access point location coordinate. In one aspect, at least one of the one or more user devices includes a cellular phone. In another aspect, at least one of the one or more wireless access point connectivity notifications is associated with a Wi-Fi network. In another aspect, all of the one or more wireless access point connectivity notifications are associated with a single wireless network. In another aspect, at least one of the one or more user devices is connected simultaneously to a cellular network and a wireless access point associated with at least one of the one or more wireless access point connectivity notifications. In another aspect, the calculation of the at least one of the user device distances is performed before receiving at least one of: one of the user device location coordinates; and one of the wireless signal strengths. In another aspect, triangulating the wireless access point location coordinate is performed substantially in real-time after receiving the user device location coordinates and the wireless signal strengths.

In another aspect, the method further comprises: receiving one or more updated user device location coordinates and one or more updated wireless signal strengths; calculating, via the processor, one or more updated user device distances using the one or more updated wireless signal strengths; triangulating, via the processor, an updated wireless access point location coordinate using the one or more updated user device location coordinates and the one or more updated user device distances; and storing the updated wireless access point location coordinate. In such embodiments, in one aspect, the one or more updated user device location coordinates and the one or more updated wireless signal strengths are associated with one of the one or more user devices.

In another aspect, a wireless access point performs the calculation of the user device distances, as well as the triangulation of the wireless access point location coordinate. In another aspect, at least one of the user device location coordinates is determined using a cellular network. In another aspect, at least one of the user device location coordinates is a GPS coordinate.

In one embodiment, a wireless access point geo-location system is disclosed, comprising: a processor; and a memory device disposed in communication with the processor and storing processor-executable instructions, the instructions comprising instructions for: receiving one or more wireless access point connectivity notifications associated with one or more user devices; receiving at least three: user device location coordinates associated with the one or more user devices, and wireless signal strengths associated with the one or more wireless access point connectivity notifications; calculating, via a processor, user device distances using the at least three wireless signal strengths; triangulating, via the processor, a wireless access point location coordinate using the at least three user device location coordinates and the calculated user device distances; and storing the wireless access point location coordinate.

In one embodiment, a non-transitory processor-readable medium is disclosed, storing processor-executable wireless access point geo-location instructions comprising instructions for: receiving one or more wireless access point connectivity notifications associated with one or more user devices; receiving at least three: user device location coordinates associated with the one or more user devices, and wireless signal strengths associated with the one or more wireless access point connectivity notifications; calculating, via a processor, user device distances using the at least three wireless signal strengths; triangulating, via the processor, a wireless access point location coordinate using the at least three user device location coordinates and the calculated user device distances; and storing the wireless access point location coordinate.

In one embodiment, a device geo-location method is disclosed, comprising: receiving one or more wireless signal strengths associated with connectivity of a user device to one or more wireless access points; calculating, via a processor, one or more distances of the user device from the one or more wireless access points using the one or more wireless signal strengths; triangulating a user device location coordinate using: a pre-determined wireless access point location coordinate associated with at least one of the one or more wireless access points; and the calculated one or more distances of the user device from the one or more wireless access points; and storing the user device location coordinate. In one aspect, the method further comprises: receiving a geo-location request for the user device; and providing the user device location coordinate after receiving the geo-location request. In another aspect, the geo-location request is received after the user device provides a service request. In another aspect, the service request is a voice-over-IP emergency call. In another aspect, the user device is one of: a cellular phone; a smartphone; a tablet computer; and a laptop computer. In another aspect, the connectivity of the user device to at least one of the one or more wireless access points is via a Wi-Fi network. In another aspect, the user device is connected simultaneously to the one or more wireless access points. In another aspect, the calculation of at least one of the one or more distances of the user device from the one or more wireless access points is performed before receiving at least one of the one or more wireless signal strengths. In another aspect, a number of wireless access points is three; and triangulating the user device location coordinate is performed substantially in real-time after receipt of three wireless signal strengths associated with connectivity of the user device to the three wireless access points.

In another aspect, the method further comprises: on a periodic basis, receiving one or more updated wireless signal strengths associated with connectivity of the user device to the one or more wireless access points; calculating, via a processor, one or more updated distances of the user device from the one or more wireless access points using the one or more updated wireless signal strengths; triangulating an updated user device location coordinate, using: the pre-determined wireless access point location coordinate associated with the at least one of the one or more wireless access points; and the calculated one or more updated distances of the user device from the one or more wireless access points; and storing the updated user device location coordinate. In another aspect, the pre-determined wireless access point location coordinate associated with the at least one of the one or more wireless access points is determined by triangulation using one or more prior user device location coordinates and one or more prior wireless signal strengths. In another aspect, the user device provides the user device location coordinate after the geo-location request is received.

In one embodiment, a device geo-location system is disclosed, comprising: a processor; and a memory device disposed in communication with the processor and storing processor-executable instructions, the instructions comprising instructions for: receiving one or more wireless signal strengths associated with connectivity of a user device to one or more wireless access points; calculating, via a processor, one or more distances of the user device from the one or more wireless access points using the one or more wireless signal strengths; triangulating a user device location coordinate using: a pre-determined wireless access point location coordinate associated with at least one of the one or more wireless access points; and the calculated one or more distances of the user device from the one or more wireless access points; and storing the user device location coordinate.

In one embodiment, a non-transitory processor-readable medium is disclosed, storing processor-executable device geo-location instructions comprising instructions for: receiving one or more wireless signal strengths associated with connectivity of a user device to one or more wireless access points; calculating, via a processor, one or more distances of the user device from the one or more wireless access points using the one or more wireless signal strengths; triangulating a user device location coordinate using: a pre-determined wireless access point location coordinate associated with at least one of the one or more wireless access points; and the calculated one or more distances of the user device from the one or more wireless access points; and storing the user device location coordinate.

Computer System

FIG. 8 is a block diagram of an exemplary computer system for implementing embodiments consistent with the present disclosure. Variations of computer system 801 may be used for implementing user devices (see, e.g., FIG. 1, 102*a-c*; FIG. 2, 202; FIG. 3A, 302*a-c*; FIG. 5A-B, 501; FIG. 7, 702), wireless access points (see, e.g., FIG. 1, 101*a-c*; FIG. 2, 201, 205; FIG. 3A, 301; FIGS. 5A-B, 502*a-f*; FIG. 7, 701*a-c*), wireless location systems (see, e.g., FIG. 2, 205), service provider systems (see, e.g., FIG. 1, 103*a-c*; FIG. 2, 205, 203; FIG. 7, 705-706), traditional infrastructure components, or the like. Computer system 801 may comprise a central processing unit ("CPU" or "processor") 802. Processor 802 may comprise at least one data processor for executing program components for executing user- or system-generated requests. The processor may include specialized processing units such as integrated system (bus) controllers, memory management control units, floating point units, graphics processing units, digital signal processing units, etc. The processor may include a microprocessor, such as AMD Athlon, Duron or Opteron, ARM's application, embedded or secure processors, IBM PowerPC, Intel's Core, Itanium, Xeon, Celeron or other line of processors, etc. The processor 802 may be implemented using mainframe, distributed processor, multi-core, parallel, grid, or other architectures. Some embodiments may utilize embedded technologies like application-specific integrated circuits (ASICs), digital signal processors (DSPs), Field Programmable Gate Arrays (FPGAs), etc.

Processor 802 may be disposed in communication with one or more input/output (I/O) devices via I/O interface 803. The I/O interface 803 may employ communication protocols/methods such as, without limitation, audio, analog, digital, monoaural, RCA, stereo, IEEE-1394, serial bus, universal serial bus (USB), infrared, PS/2, BNC, coaxial, component, composite, digital visual interface (DVI), high-definition multimedia interface (HDMI), RF antennas, S-Video, VGA, IEEE 802.n /b/g/n/x, Bluetooth, cellular (e.g., code-division multiple access (CDMA), high-speed packet access (HSPA+), global system for mobile communications (GSM), long-term evolution (LTE), WiMax, or the like), etc.

Using the I/O interface 803, the computer system 801 may communicate with one or more I/O devices. For example, the input device 804 may be an antenna, keyboard, mouse, joystick, (infrared) remote control, camera, card reader, fax machine, dongle, biometric reader, microphone, touch screen, touchpad, trackball, sensor (e.g., accelerometer, light sensor, GPS, gyroscope, proximity sensor, or the like), stylus, scanner, storage device, transceiver, video device/source, visors, etc. Output device 805 may be a printer, fax machine, video display (e.g., cathode ray tube (CRT), liquid crystal display (LCD), light-emitting diode (LED), plasma, or the like), audio speaker, etc. In some embodiments, a transceiver 806 may be disposed in connection with the processor 802. The transceiver may facilitate various types of wireless transmission or reception. For example, the transceiver may include an antenna operatively connected to a transceiver chip (e.g., Texas Instruments WiLink WL1283, Broadcom BCM4750IUB8, Infineon Technologies X-Gold 618-PMB9800, or the like), providing IEEE 802.11a/b/g/n, Bluetooth, FM, global positioning system (GPS), 2G/3G HSDPA/HSUPA communications, etc.

In some embodiments, the processor 802 may be disposed in communication with a communication network 808 via a network interface 807. The network interface 807 may communicate with the communication network 808. The network interface may employ connection protocols including, without limitation, direct connect, Ethernet (e.g., twisted pair 10/100/1000 Base T), transmission control protocol/internet protocol (TCP/IP), token ring, IEEE 802.11a/b/g/n/x, etc. The communication network 808 may include, without limitation, a direct interconnection, local area network (LAN), wide area network (WAN), wireless network (e.g., using Wireless Application Protocol), the Internet, etc. Using the network interface 807 and the communication network 808, the computer system 801 may communicate with devices 810, 811, and 812. These devices may include, without limitation, personal computer(s), server(s), fax machines, printers, scanners, various mobile devices such as cellular telephones, smartphones (e.g., Apple iPhone, Blackberry, Android-based phones, etc.), tablet computers, eBook readers (Amazon Kindle, Nook, etc.), laptop computers, notebooks, gaming consoles (Microsoft Xbox, Nintendo DS, Sony PlayStation, etc.), or the like. In some embodiments, the computer system 801 may itself embody one or more of these devices. Any of these devices may serve as the user devices, wireless access points, wireless location systems, servers, or other system components utilized in the present disclosure.

In some embodiments, the processor 802 may be disposed in communication with one or more memory devices (e.g., RAM 813, ROM 814, etc.) via a storage interface 812. The storage interface may connect to memory devices including, without limitation, memory drives, removable disc drives, etc., employing connection protocols such as serial advanced technology attachment (SATA), integrated drive electronics (IDE), IEEE-1394, universal serial bus (USB), fiber channel, small computer systems interface (SCSI), etc. The memory drives may further include a drum, magnetic disc drive, magneto-optical drive, optical drive, redundant array of independent discs (RAID), solid-state memory devices, solid-state drives, etc.

The memory devices may store a collection of program or database components, including, without limitation, an operating system 816, user interface application 817, web browser 818, mail server 819, mail client 820, user/application data 821 (e.g., any data variables or data records discussed in this disclosure), etc. The operating system 816 may facilitate resource management and operation of the computer system 801. Examples of operating systems include, without limitation, Apple Macintosh OS X, Unix, Unix-like system distributions (e.g., Berkeley Software Distribution (BSD), FreeBSD, NetBSD, OpenBSD, etc.), Linux distributions (e.g., Red Hat, Ubuntu, Kubuntu, etc.), IBM OS/2, Microsoft Windows (XP, Vista/7/8, etc.), Apple iOS, Google Android, Blackberry OS, or the like. User interface 817 may facilitate display, execution, interaction, manipulation, or operation of program components through textual or graphical facilities. For example, user interfaces may provide computer interaction interface elements on a display system operatively connected to the computer system 801, such as cursors, icons, check boxes, menus, scrollers, windows, widgets, etc. Graphical user interfaces (GUIs) may be employed, including, without limitation, Apple Macintosh operating systems' Aqua, IBM OS/2, Microsoft Windows (e.g., Aero, Metro, etc.), Unix X-Windows, web interface libraries (e.g., ActiveX, Java, Javascript, AJAX, HTML, Adobe Flash, etc.), or the like.

In some embodiments, the computer system 801 may implement a web browser 818 stored program component. The web browser may be a hypertext viewing application, such as Microsoft Internet Explorer, Google Chrome, Mozilla Firefox, Apple Safari, etc. Secure web browsing may be provided using HTTPS (secure hypertext transport protocol), secure sockets layer (SSL), Transport Layer Security (TLS), etc. Web browsers may utilize facilities such as AJAX, DHTML, Adobe Flash, JavaScript, Java, application programming interfaces (APIs), etc. In some embodiments, the computer system 801 may implement a mail server 819 stored program component. The mail server may be an Internet mail server such as Microsoft Exchange, or the like. The mail server may utilize facilities such as ASP, ActiveX, ANSI C++/C#, Microsoft .NET, CGI scripts, Java, JavaScript, PERL, PHP, Python, WebObjects, etc. The mail server may utilize communication protocols such as internet message access protocol (IMAP), messaging application programming interface (MAPI), Microsoft Exchange, post office protocol (POP), simple mail transfer protocol (SMTP), or the like. In some embodiments, the computer system 801 may implement a mail client 820 stored program component. The mail client may be a mail viewing application, such as Apple Mail, Microsoft Entourage, Microsoft Outlook, Mozilla Thunderbird, etc.

In some embodiments, computer system 801 may store user/application data 821, such as the data, variables, records, etc. (e.g., user ID, device ID, MAC address, IP address, network address, historical wireless access point/user device location coordinates, wireless signal strengths, signal strength-to-distance conversion formulas/look-up tables, wireless access point ID, wireless SSID, cellular network ID, cellular provider name, GPS coordinates records, LBS requests, LBS server URLs, current wireless access point location coordinates, current user device location coordinates, application usage records, etc.) as described in this disclosure. Such databases may be implemented as fault-tolerant, relational, scalable, secure databases such as Oracle or Sybase. Alternatively, such databases may be implemented using standardized data structures, such as an array, hash, linked list, struct, structured text file (e.g., XML), table, or as object-oriented databases (e.g., using ObjectStore, Poet, Zope, etc.). Such databases may be consolidated or distributed, sometimes among the various computer systems discussed above in this disclosure. It is to be understood that the structure and operation of the any computer or database component may be combined, consolidated, or distributed in any working combination.

The specification has described systems and methods for effective identification of geo-location in mobile HetNet environments. The illustrated steps are set out to explain the exemplary embodiments shown, and it should be anticipated that ongoing technological development will change the manner in which particular functions are performed. These examples are presented herein for purposes of illustration, and not limitation. Further, the boundaries of the functional building blocks have been arbitrarily defined herein for the convenience of the description. Alternative boundaries can be defined so long as the specified functions and relationships thereof are appropriately performed. Alternatives (including equivalents, extensions, variations, deviations, etc., of those described herein) will be apparent to persons skilled in the relevant art(s) based on the teachings contained herein. Such alternatives fall within the scope and spirit of the disclosed embodiments.

Furthermore, one or more computer-readable storage media may be utilized in implementing embodiments consistent with the present disclosure. A computer-readable storage medium refers to any type of physical memory on which information or data readable by a processor may be stored. Thus, a computer-readable storage medium may store instructions for execution by one or more processors, including instructions for causing the processor(s) to perform steps or stages consistent with the embodiments described herein. The term "computer-readable medium" should be understood to include tangible items and exclude carrier waves and transient signals, i.e., be non-transitory. Examples include random access memory (RAM), read-only memory (ROM), volatile memory, nonvolatile memory, hard drives, CD ROMs, DVDs, flash drives, disks, and any other known physical storage media.

It is intended that the disclosure and examples be considered as exemplary only, with a true scope and spirit of disclosed embodiments being indicated by the following claims.

What is claimed is:

1. A wireless access point geo-location method, comprising:
receiving, by a wireless access point, a trigger of determining a wireless access point location coordinate, wherein the trigger includes receiving a first wireless access point connectivity notification;
acquiring, by the wireless access point, one or more second wireless access point connectivity notifications associated with one or more user devices, after receiving the trigger;
receiving, by the wireless access point, at least three: user device location coordinates associated with the one or more user devices, and wireless signal strengths associated with the first wireless access point connectivity notification and with the one or more second wireless access point connectivity notifications;

calculating, via a processor of the wireless access point, user device distances using the at least three wireless signal strengths, a first antenna gain associated with a transmitting antenna of the wireless access point, one or more second antenna gains associated with the one or more user devices, one or more wireless signal wavelengths, and an effect on wireless signal strength by at least one of: a yaw angle, a tilt angle, a roll angle, and a pitch angle of the wireless access point and/or the one or more user devices with respect to the horizontal earth;

calculating, via the processor, a wireless access point location coordinate using the at least three user device location coordinates and the calculated user device distances; and storing, at the wireless access point, the wireless access point location coordinate.

2. The method of claim 1, wherein at least one of the one or more user devices includes a cellular phone.

3. The method of claim 1, wherein at least one of the one or more wireless access point connectivity notifications is associated with a Wi-Fi network.

4. The method of claim 1, wherein all of the one or more wireless access point connectivity notifications are associated with a single wireless network.

5. The method of claim 1, wherein at least one of the one or more user devices is connected simultaneously to a cellular network and a wireless access point associated with at least one of the one or more wireless access point connectivity notifications.

6. The method of claim 1, wherein the calculation of the at least one of the user device distances is performed before receiving at least one of: one of the user device location coordinates; and one of the wireless signal strengths.

7. The method of claim 1, wherein calculating the wireless access point location coordinate is performed substantially in real-time after receiving the user device location coordinates and the wireless signal strengths.

8. The method of claim 1, further comprising:
receiving one or more updated user device location coordinates and one or more updated wireless signal strengths;
calculating, via the processor, one or more updated user device distances using the one or more updated wireless signal strengths;
calculating, via the processor, an updated wireless access point location coordinate using the one or more updated user device location coordinates and the one or more updated user device distances; and
storing the updated wireless access point location coordinate.

9. The method of claim 8, wherein the one or more updated user device location coordinates and the one or more updated wireless signal strengths are associated with one of the one or more user devices.

10. The method of claim 1, wherein a wireless access point performs the calculation of the user device distances, as well as the calculation of the wireless access point location coordinate.

11. The method of claim 1, wherein at least one of the user device location coordinates is either of: determined using a cellular network; and a GPS coordinate.

12. A wireless access point geo-location system, comprising a wireless access point, wherein the wireless access point comprises:
a processor; and
a memory device disposed in communication with the processor and storing processor-executable instructions, the instructions comprising instructions for:
receiving a trigger of determining a wireless access point location coordinate, wherein the trigger includes receiving a first wireless access point connectivity notification;
after receiving the trigger, acquiring one or more second wireless access point connectivity notifications associated with one or more user devices;
receiving at least three: user device location coordinates associated with the one or more user devices, and wireless signal strengths associated with the first wireless access point connectivity notification and with the one or more second wireless access point connectivity notifications;
calculating, via the processor, user device distances using the at least three wireless signal strengths, a first antenna gain associated with a transmitting antenna of the wireless access point, one or more second antenna gains associated with the one or more user devices, one or more wireless signal wavelengths, and an effect on wireless signal strength by at least one of: a yaw angle, a tilt angle, a roll angle, and a pitch angle of the wireless access point and/or the one or more user devices with respect to the horizontal earth;
calculating, via the processor, a wireless access point location coordinate using the at least three user device location coordinates and the calculated user device distances; and
storing the wireless access point location coordinate at the wireless access point.

13. A device geo-location method, comprising:
receiving, by a wireless access point, a trigger of determining a user device location coordinate, wherein the trigger includes receiving a first wireless access point connectivity notification;
acquiring, by the wireless access point, one or more second wireless access point connectivity notifications associated with one or more user devices, after receiving the trigger;
calculating, via a processor of the wireless access point, one or more distances of the user device from the one or more wireless access points using one or more wireless signal strengths associated with the first wireless access point connectivity notification and with the one or more second wireless access point connectivity notifications, a first antenna gain associated with a transmitting antenna of the one or more wireless access points, one or more second antenna gains associated with the one or more user devices, one or more wireless signal wavelengths, and an effect on wireless signal strength by at least one of: a yaw angle, a tilt angle, a roll angle, and a pitch angle of the wireless access point and/or the one or more user devices with respect to the horizontal earth;
calculating, by the processor, a user device location coordinate using: a pre-determined wireless access point location coordinate associated with at least one of the one or more wireless access points; and the calculated one or more distances of the user device from the one or more wireless access points; and
storing, at the wireless access point, the user device location coordinate.

14. The method of claim 13, further comprising:
receiving a geo-location request for the user device; and
providing the user device location coordinate after receiving the geo-location request.

15. The method of claim 14, wherein the geo-location request is received after the user device provides a service request.

16. The method of claim 15, wherein the service request is a voice-over-IP emergency call.

17. The method of claim 13, wherein the user device is one of: a cellular phone;
a smartphone; a tablet computer; and a laptop computer.

18. The method of claim 13, wherein the connectivity of the user device to at least one of the one or more wireless access points is via a Wi-Fi network.

19. The method of claim 13, wherein the user device is connected simultaneously to the one or more wireless access points.

20. The method of claim 13, wherein the calculation of at least one of the one or more distances of the user device from the one or more wireless access points is performed before receiving at least one of the one or more wireless signal strengths.

21. The method of claim 13, wherein:
a number of wireless access points is three; and
calculating the user device location coordinate is performed substantially in real-time after receipt of three wireless signal strengths associated with connectivity of the user device to the three wireless access points.

22. The method of claim 13, further comprising:
on a periodic basis,
receiving one or more updated wireless signal strengths associated with connectivity of the user device to the one or more wireless access points;
calculating, via the processor, one or more updated distances of the user device from the one or more wireless access points using the one or more updated wireless signal strengths;
calculating, by the processor, an updated user device location coordinate, using: the pre-determined wireless access point location coordinate associated with the at least one of the one or more wireless access points; and the calculated one or more updated distances of the user device from the one or more wireless access points; and
storing the updated user device location coordinate.

23. The method of claim 13, wherein the pre-determined wireless access point location coordinate associated with the at least one of the one or more wireless access points is calculated based on one or more prior user device location coordinates and one or more prior wireless signal strengths.

24. A device geo-location system, comprising a wireless access point, wherein the wireless access point comprises:
a processor; and
a memory device disposed in communication with the processor and storing processor-executable instructions, the instructions comprising instructions for:
receiving a trigger of determining a user device location coordinate, wherein the trigger includes receiving a first wireless access point connectivity notification;
after receiving the trigger, acquiring one or more second wireless access point connectivity notifications associated with one or more user devices;
calculating, via the processor, one or more distances of the user device from the one or more wireless access points using one or more wireless signal strengths associated with the first wireless access point notification and with the one or more second wireless access point connectivity notifications, a first antenna gain associated with a transmitting antenna of the wireless access point, one or more second antenna gains associated with the one or more user devices, one or more wireless signal wavelengths, and an effect on wireless signal strength by at least one of: a yaw angle, a tilt angle, a roll angle, and a pitch angle of the wireless access point and/or the one or more user devices with respect to the horizontal earth;
calculating a user device location coordinate using: a pre-determined wireless access point location coordinate associated with at least one of the one or more wireless access points; and the calculated one or more distances of the user device from the one or more wireless access points; and
storing the user device location coordinate at the wireless access point.

25. The method of claim 1, wherein the trigger further includes at least one of: a new wireless connectivity between a user device and the wireless access point associated with the wireless access point location coordinate, generation of a new wireless connectivity notification, a lapse of time beyond a pre-determined threshold after the prior calculation or update of the wireless access point location coordinate, and receiving a geo-location request.

26. The method of claim 14, wherein the trigger includes at least one of: a new wireless connectivity between a wireless access point and a user device associated with the user device location coordinate, generation of a new wireless connectivity notification, a lapse of time beyond a pre-determined threshold after the prior calculation or update of the user device location coordinate, and receiving the geo-location request.

27. The method of claim 1, further comprising:
After receiving the first wireless access point connectivity notification, searching, by the wireless access point, the one or more second wireless access point connectivity notifications.

* * * * *